United States Patent [19]

Heyne et al.

[11] 4,174,118
[45] Nov. 13, 1979

[54] PIVOTAL LOG BUNK SUPPORT FOR VEHICLES

[75] Inventors: Cecil I. Heyne; Leelin F. Kirk, both of Estacada, Oreg.

[73] Assignee: Rowley Trailers, Inc., Estacada, Oreg.

[21] Appl. No.: 820,790

[22] Filed: Aug. 1, 1977

[51] Int. Cl.² .............................................. B62D 53/08
[52] U.S. Cl. ................................................. 280/179 R
[58] Field of Search ................. 280/179 R, 434, 143, 280/145, 405 B, 404, 439–441; 296/343; 308/136, 137, 238; 105/199 C

[56] References Cited

U.S. PATENT DOCUMENTS

| | | | |
|---|---|---|---|
| 2,779,605 | 1/1957 | Braunberger | 280/440 |
| 3,037,793 | 6/1962 | Gouirund | 280/440 |
| 3,350,116 | 10/1967 | Skirvim et al. | 280/404 |
| 3,430,987 | 3/1969 | Whitmire et al. | 280/404 X |
| 3,545,635 | 12/1970 | Martan | 280/404 X |

Primary Examiner—Joseph F. Peters, Jr.
Assistant Examiner—Norman L. Stack, Jr.
Attorney, Agent, or Firm—Eugene M. Eckelman

[57] ABSTRACT

A base member is arranged to be secured in a fixed position on a vehicle and has a top surface upon which a flat disc of resinous plastic material is seated to form a load supporting bearing. A load plate having a bunk secured thereto is seated on the plastic disc and is connected to the base member for rotation thereon. The base member, together with the resinous plastic disc and the load plate, have a width sufficient to provide sole support for a bunk on the vehicle. Resinous plastic annular rings are secured to the assembly to provide thrust surfaces between the load plate and the base member.

5 Claims, 5 Drawing Figures

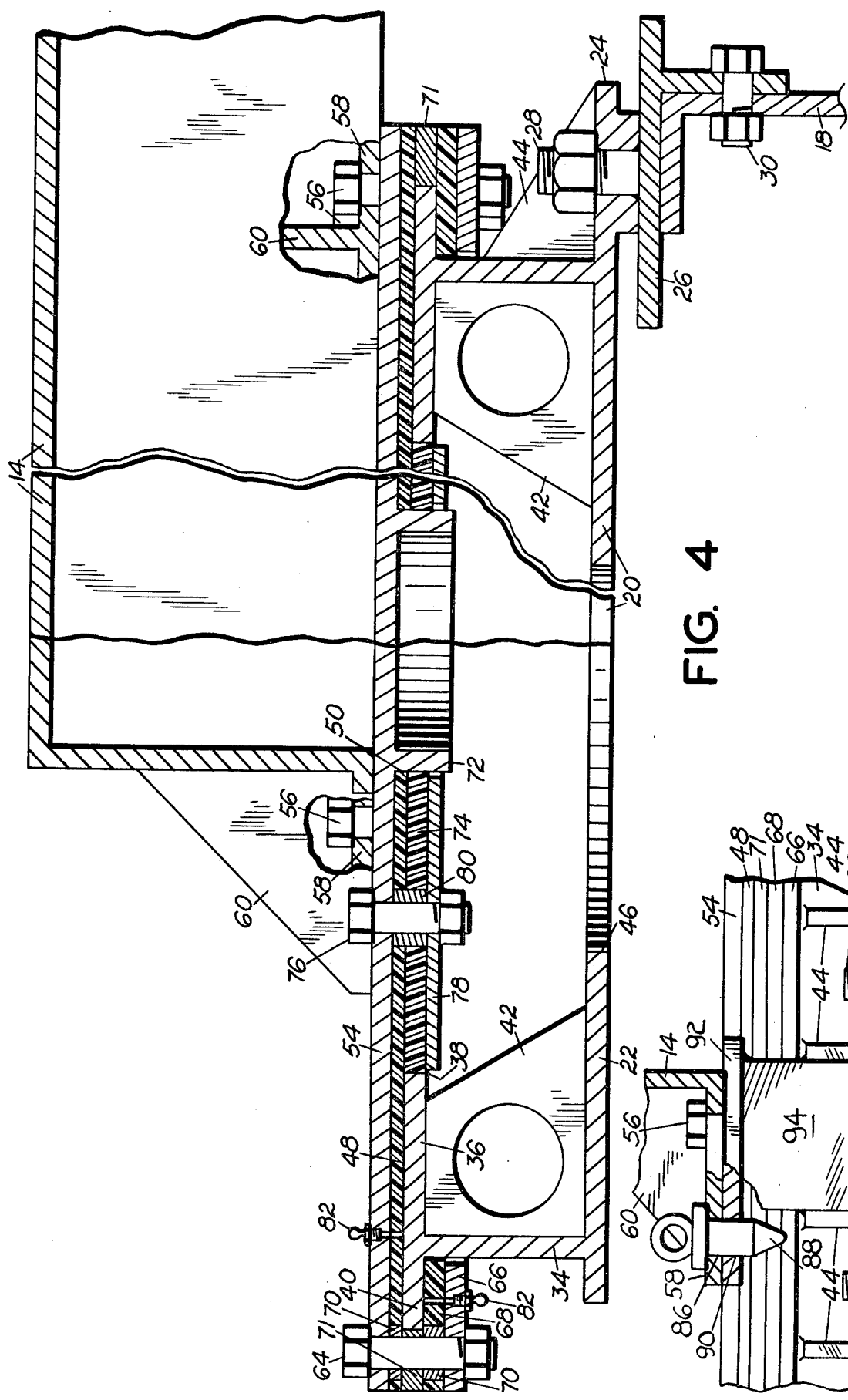

PIVOTAL LOG BUNK SUPPORT FOR VEHICLES

BACKGROUND OF THE INVENTION

This invention relates to new and useful improvements in pivotal log bunk supports for vehicles.

Various types of log bunk supports have been provided for vehicles of the type that haul logs, poles, or similar items, and such supports have not been altogether satisfactory in possessing combined features of safe operation, long life, economy in manufacture and maintainence, and other factors. Such is understandable since this type of pivotal support is subjected to extremely heavy loads, twisting and thrust forces.

One type of pivotal log bunk support commonly in use is known as the cup and saucer type wherein a rather small diameter central pivotal support is provided and outrigger type supports are employed to support the bunk in the event of uneven lateral weight conditions. This cup and saucer type support has been found to possess certain disadvantages one of which is that due to its minimum lateral width, it does not provide any appreciable lateral support for the bunk. Thus, the bunk constantly engages the outrigger supports which wear down rather fast and furthermore have the disadvantage that the bunk can get hung up on these outrigger supports to cause a dangerous condition.

SUMMARY OF THE INVENTION

According to the present invention and forming a primary objective thereof, a pivotal log bunk support for vehicles is provided which is of a structure overcoming disadvantages of prior structures and at the same time is substantially economical to manufacture and has long life in use.

To carry out these objectives, the support comprises a base member which has a top surface on which a disc of resinous plastic material is seated to form a bearing surface for a load plate secured to the bunk. The load plate is connected to the base member for pivotal movement, and importantly, the base member and associated structure is of a width sufficient to provide sole lateral support for the bunk. Thrust means in the form of resinous plastic annular rings are disposed between the base member and the load plate.

The invention will be better understood and additional objects and advantages will become apparent from the following description taken in connection with the accompanying drawings.

BRIEF DESCRIPTION OF THE DRAWINGS

FIG. 4 is an enlarged fragmentary sectional view taken on the line 4—4 of FIG. 3; and FIG. 5 is an enlarged fragmentary sectional view on the line 5—5 of FIG. 3.

DETAILED DESCRIPTION OF A PREFERRED EMBODIMENT

Figure 1:
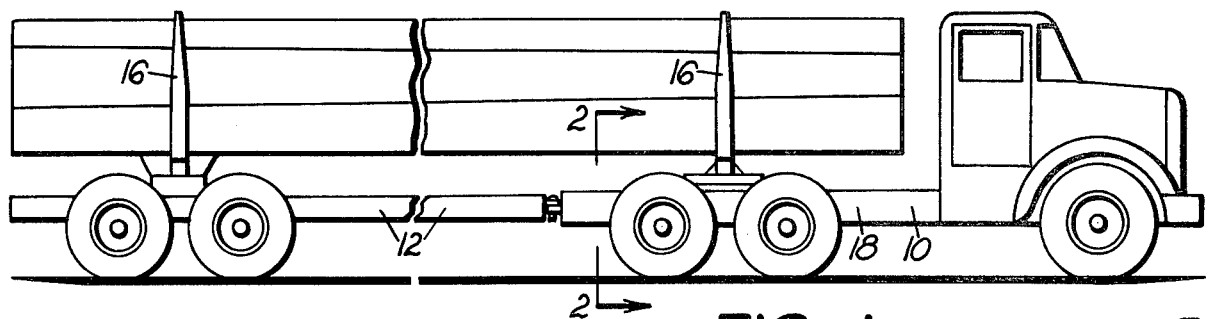
FIG. 1 is an elevational view of a log truck which is shown for the purpose of illustrating a use of the present invention.

With particular reference to FIG. 1, a log truck 10 is illustrated on which the present invention may be embodied. Such log truck pulls a trailer 12, and these vehicles are provided with log bunk assemblies having a rigid transverse member 14, FIGS. 2, 3 and 4, and end stakes 16. The log bunk assemblies are provided on each of the tractor and trailer portions and each can be supported by the present pivotal support, although it is to be understood that slight adaptation may be necessary between the installation structure on the tractor and on the trailer. For the purpose of illustrating the present invention, the pivotal support shown is the one provided on the tractor portion, and such tractor portion has the usual longitudinal channel frame members 18.

The present pivotal log bunk support comprises a base 20 having a bottom plate 22 with side integral extensions 24 arranged to be secured to the frame members 18 by means of adapter brackets 26, these brackets having integral studs 28 for bolting to the side extensions 24 and being associated with bolts 30 for bolting to the frame members 18 of the vehicle.

A circular body member 34 of the base extends upwardly from the bottom plate 22 in integral relation and is integral with a top plate 36 having a central opening 38. Plate 36 has a peripheral flange 40 that extends outwardly from the body member 34. Gussets 42 interiorly of the body member 34 reinforce and integrate the base plate 22, upright member 34 and top plate 36, and in addition, outer reinforcing gussets 44 are provided between the body member 34 and the side extensions 24. Bottom plate 22 has a central opening 46.

Seated on the top surface of plate 36 is a bearing disc 48 formed of resinous plastic. The bearing disc 48 as an example may be constructed of polyurethane, polyethelene, various polymers, or other material, it being necessary that such resinous plastics be rugged in use for long life and possess good lubricating qualities. This bearing disc has a central opening 50.

Seated on the top of bearing disc 48 is a load plate 54 having bolted connection, by means of bolts 56, to projecting extensions 58 on the bunk. Reinforcing members 60 are secured between the transverse member 14 of the bunk and the load plate 54.

Load plate 54 has a greater diameter than flange 40, and this plate is held on the base member 20 by a plurality of bolts 64 which extend through the load plate and an annular retainer ring 66 disposed on the bottom side of the flange. An annular ring 68 of resinous plastic material similar so that used for the bearing plate 48 is disposed between the retainer ring 66 and flange 40. This ring has the same outer diameter as the load plate 54 and has suitable holes for receiving the bolts 64 as does the load plate 54. Spacers 70 on the bolts 64 are provided in the areas of members 48 and 68 and a spacer ring 71 having suitable bores to receive bolts 64 is provided in the area of flange 40 so that, although a fixed connection is provided between the members 48, 54, 66 and 68, there will not be a binding attachment to the flange 40, and furthermore the plastic members 48 and 68 will not be overly compressed.

Plastic member 68, which may be of similar plastic material as bearing plate 48, is thickened and the inner edge thereof has a snug engagement against the outer surface of circular body member 34. Ring 68 thus serves as the principal horizontal thrust bearing surface in the assembly in all lateral directions. The inner diameter of retainer ring 66 is greater than the outer diameter of body member 34 to provide a clearance which prevents metal to metal contact.

Load plate 54 has a central depending boss 72 extending down through the opening 50 in the bearing disc 48. The opening 38 in top plate 36 of base 20 is of substantially larger diameter than the outer diameter of boss 72, and disposed in this space to provide further lateral thrust bearing surfaces is an annular ring 74 of a resinous plastic material which may be of similar plastic material as bearing plate 48. This ring is held in place by a series of bolts 76 passing down through suitable openings in the load plate 54 as well as in the bearing plate 48 and thrust ring 74. Bolts 76 also pass through suitable holes in a bottom retainer ring 78 which supports the thrust ring 74 on the assembly. Bolts 76 are provided with spacers 80 in the area of the bearing plate 48 and thrust ring 74 so as not to compress the plastic members.

Although the plastic bearing and thrust members of the assembly may be constructed of self lubricating plastic, lubricating fittings 82 may be provided as desired in order to further lubricate bearing surfaces.

Figure 2:
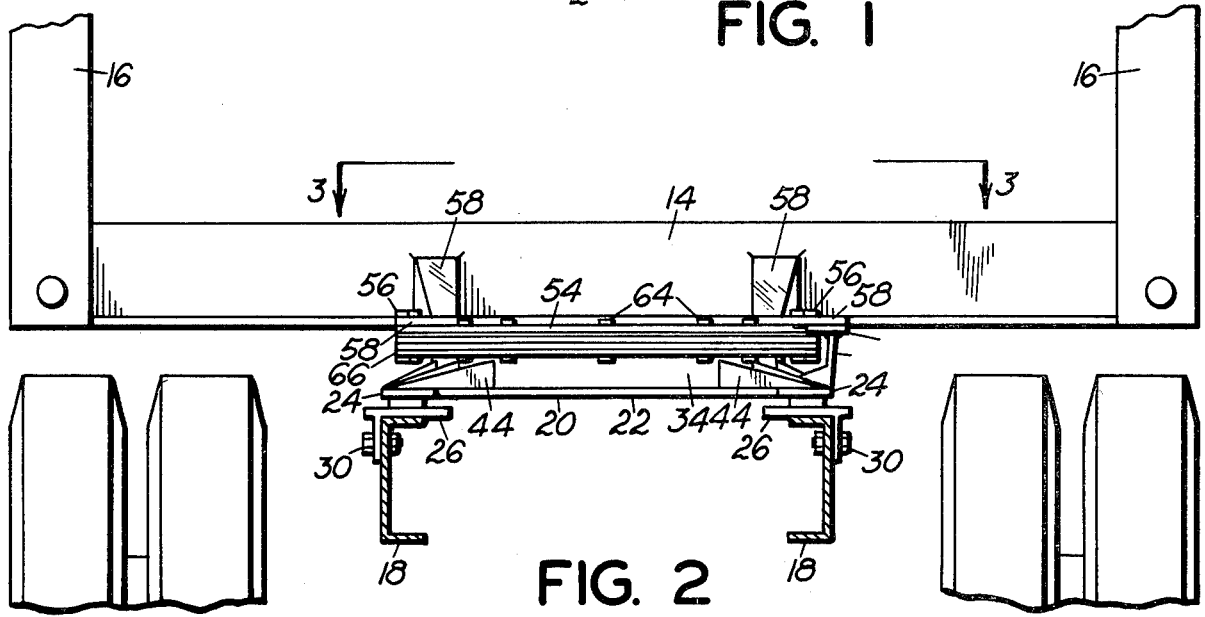
FIG. 2 is an enlarged vertical sectional view taken on the line 2—2 of FIG. 1.

In the operation of the assembly, the bunk 14 and its integrated load plate 54, together with the bearing plate 48, retainer ring 66 and thrust ring 68, have turning attachment on the flange 40. Thrust ring 74 and its retaining ring 78 turn with the load plate 54. As best seen in FIG. 2, the overall diameter of the base 20 and load support plate 54 is of substantial width, and such width is sufficient so that outrigger supports are not necessary. The load plate 54 thus has a wide bearing support to provide adequate lateral support for the bunk 14 and at the same time provide an assembly which is safe in use, efficient in operation, and economical to manufacture.

Figure 3:
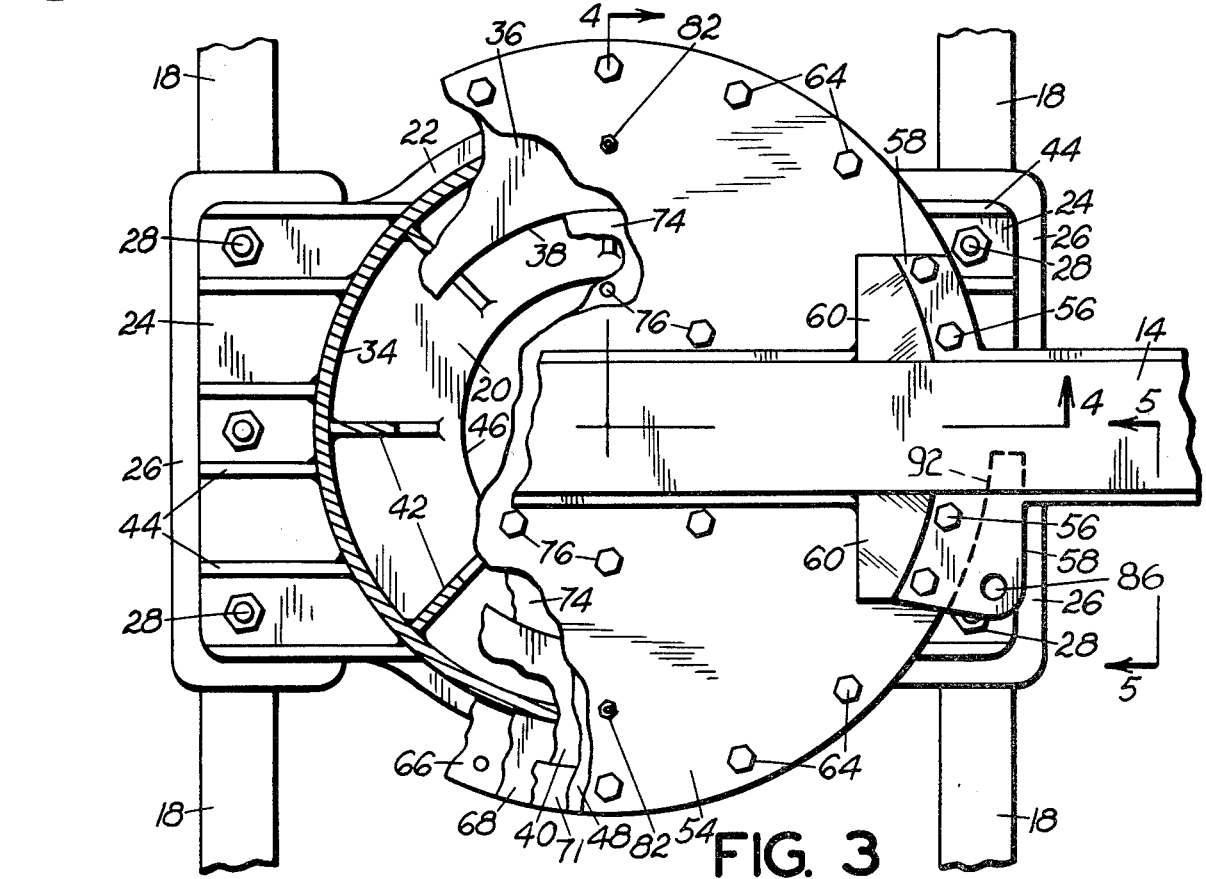
FIG. 3 is a fragmentary plan view, partly broken away, taken on the line 3—3 of FIG. 2.

It may be desired at times to lock the bunk in its lateral position, and for this purpose one of the projecting extensions 58 on the bunk has an aperture 86, FIGS. 3 and 5, arranged to receive a removable lock pin 88 also engageable in an aperture 90 in plate 92 on a post 94 integral with side extensions 24 of base 20. This lock pin will be removed as shown in FIG. 1 when the bunk carries a load to allow pivotal movement of the bunk but will generally be inserted as shown in FIG. 5 when the bunk is empty to prevent free turning thereof.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A pivotal log bunk for vehicles comprising
   (a) a base member arranged to be secured in a fixed position on the vehicle,
   (b) said base member having an upright exterior circular peripheral surface and a flat substantially horizontal top surface,
   (c) a flat disc member of resinous plastic seated on said top surface and operating with said surface as a load supporting bearing,
   (d) a load plate seated on said disc member,
   (e) means on said load plate arranged to secure a bunk integrally thereto,
   (f) a flange on said base member extending outwardly around an outer portion thereof,
   (g) an annular retainer plate engaging under said flange,
   (h) an annular resinous plastic disc disposed between said retainer plate and said flange and having edge thrust bearing engagement against said peripheral surface of the base member,
   (i) and bolt means releasably securing said load plate and retainer plate together for rotation horizontally on said base member,
   (j) said base member and disc member having an extended width so as to provide sole lateral support for a bunk on the load plate.

2. The pivotal log bunk support of claim 1 including spacer means on said bolts preventing compression of said plastic bearing disc upon tightening of said bolt.

3. The pivotal log bunk support of claim 1 wherein said base member and said load supporting plate have opposed upright surfaces inwardly from the outer portion thereof, and an auxiliary annular resinous plastic disc mounted between said opposed surfaces and having edge thrust bearing engagement therewith.

4. A pivotal log bunk support for vehicles comprising
   (a) a base member arranged to be secured in a fixed position on the vehicle,
   (b) said base member having an upright exterior circular peripheral surface and a flat substantially horizontal top surface,
   (c) a flange on said base member extending outwardly around an outer portion thereof,
   (d) a flat disc member of resinous plastic seated on said top surface and operating with said surface as a load supporting bearing,
   (e) a load plate seated on said disc member,
   (f) said load plate being of larger diameter than said flange whereby to extend outwardly therebeyond in a projecting portion,
   (g) means on said load plate arranged to secure a bunk integrally thereto,
   (h) an annular retainer ring disposed under said flange,
   (i) said retainer ring also being of larger diameter than said flange whereby to extend outwardly there beyond in a projecting portion,
   (j) and releasable fastening means extending through the projecting portions of said load plate and said annular ring for securing said ring rotatably to said base member,
   (k) said base member and disc member having an extended width so as to provide sole lateral support for a bunk on the load plate.

5. The pivotal log bunk support of claim 4 wherein said base member and said load supporting plate have opposed upright surfaces inwardly from the outer portion thereof, and an auxiliary annular resinous plastic disc mounted between said opposed surfaces and having edge thrust bearing engagement therewith.

* * * * *